(12) United States Patent
Matsueda

(10) Patent No.: US 10,814,712 B2
(45) Date of Patent: Oct. 27, 2020

(54) MOUNTING STRUCTURE OF ENGINE MOUNT

(71) Applicant: TOYOTA JIDOSHA KABUSHIKI KAISHA, Toyota-shi, Aichi-ken (JP)

(72) Inventor: Koji Matsueda, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/111,621

(22) Filed: Aug. 24, 2018

(65) Prior Publication Data

US 2019/0084398 A1 Mar. 21, 2019

(30) Foreign Application Priority Data

Sep. 20, 2017 (JP) .................................. 2017-180204

(51) Int. Cl.
| F16M 11/00 | (2006.01) |
| B60K 5/12 | (2006.01) |
| F16B 5/02 | (2006.01) |
| F16B 19/02 | (2006.01) |
| F16B 35/00 | (2006.01) |
| F16B 43/00 | (2006.01) |

(52) U.S. Cl.
CPC .............. *B60K 5/12* (2013.01); *F16B 5/0241* (2013.01); *F16B 19/02* (2013.01); *F16B 35/00* (2013.01); *F16B 43/00* (2013.01)

(58) Field of Classification Search
CPC ................................ F16H 7/0848; B60K 5/12
See application file for complete search history.

(56) References Cited

U.S. PATENT DOCUMENTS

| 7,959,218 B2 * | 6/2011 | Endou | ..................... B62D 33/07 |
| | | | 296/190.04 |
| 2006/0094548 A1 * | 5/2006 | Sato | ...................... F16H 7/0848 |
| | | | 474/109 |
| 2010/0032983 A1 * | 2/2010 | Kusaka | ................ B60G 99/004 |
| | | | 296/187.03 |

FOREIGN PATENT DOCUMENTS

| JP | 2009-023597 A | 2/2009 |
| JP | 2011-098645 A | 5/2011 |

* cited by examiner

*Primary Examiner* — Amy J. Sterling
(74) *Attorney, Agent, or Firm* — Oliff PLC

(57) ABSTRACT

A frame-side pin hole is provided in an inner face which is a vertical face of a front side frame that is a part of a vehicle frame and in contact with a bracket face of an engine mount. An engine mount-side pin hole is provided in the bracket face which is a vertical face of the engine mount and in contact with the front side frame (inner face). Additionally, a displacement suppressing pin is inserted through the frame-side pin hole and the engine mount-side pin hole.

12 Claims, 9 Drawing Sheets

MOUNTING STRUCTURE OF ENGINE MOUNT

CROSS REFERENCE TO RELATED APPLICATION

The disclosure of Japanese Patent Application No. 2017-180204 filed on Sep. 20, 2017 including the specification, claims, drawings, and abstract is incorporated herein by reference in its entirety.

TECHNICAL FIELD

The present disclosure relates to a structure for mounting an engine mount, and more particularly to a structure for mounting an engine mount on a vehicle frame by bolts.

BACKGROUND

Conventionally, an engine mount is mounted in a vehicle. The engine mount is a part which is provided between an engine and a vehicle body to connect them. The engine mount functions (provides a vibration preventing/damping function) to suppress transmission of engine vibrations to the vehicle body and (provides a supporting function) to support the engine weight while regulating the displacement of the engine due to a torque reaction or a road surface input.

The engine mount is normally mounted on the vehicle frame by means of bolts. Specifically, the engine mount has a bracket serving as a mounting member, and the bracket and the vehicle frame are mutually bolted. For example, JP 2011-98645 A discloses a structure for mounting the engine mount on the vehicle frame by a plurality of bolts. And JP 2009-23597 A discloses a structure for mounting the engine mount on the vehicle frame by three bolts, which form a triangle when the bolt positions are mutually connected by a straight line, in order to improve supporting rigidity for the engine.

To mount the engine mount on the vehicle frame by means of bolts, the bolts are inserted through the bolt holes formed in the vehicle frame and in the bracket of the engine mount and tightened by nuts. FIG. 9 is a sectional view showing a state that the vehicle frame and the bracket of the engine mount are tightened by a bolt.

The bolt holes formed in the vehicle frame and the bracket have a diameter slightly larger than the bolt diameter so to insert the bolt with allowance. Therefore, in the bolt-tightened state as shown in FIG. 9, a clearance is formed between the outer face of the bolt and the inner faces of the bolt holes formed in the vehicle frame and the bracket.

In such a state, when a force exceeding the maximum static friction force between the vehicle frame and the bracket is applied in a direction parallel to the contact faces of the vehicle frame and the bracket, the vehicle frame and the bracket are relatively moved (displaced) in a direction parallel to the contact faces between them. This displacement in the direction along the contact faces between the objects fastened by the bolt is called slippage.

Especially, as shown in FIG. 9, when the bolt is inserted and fixed through the bolt hole formed in the vertical face of the vehicle frame and the bolt hole formed in the vertical face of the bracket; namely, when the bolt is tightened horizontally, the vehicle frame and the engine mount receive a large force due to the road surface input, particularly in a vertical direction (namely, the direction parallel to the contact face). Therefore, when the bolt is tightened horizontally, the slippage occurs particularly easily between the vehicle frame and the bracket.

The occurrence of the slippage between the vehicle frame and the bracket induces slippage between the vehicle frame or the bracket and the bolt or the nut, and a torque is generated on the seat surface of the bolt or the nut in a bolt loosening direction. Therefore, the slippage occurs repeatedly between the vehicle frame and the engine mount, resulting in a problem that the bolt loosens. When the bolt loosens, fixing of the engine mount to the vehicle frame becomes insufficient, the functions of the engine mount are not exhibited properly, and there may be caused a problem such as vibration or noise of the vehicle.

An object of the present disclosure is to suppress loosening of the horizontally tightened bolts for mounting an engine mount to a vehicle frame.

SUMMARY

Technical Problem

The present disclosure relates to an engine mount mounting structure for mounting an engine mount on a vehicle frame by tightening bolts horizontally, which comprises a frame-side pin hole which is provided in a vertical face of the vehicle frame which is in contact with the engine mount; an engine mount-side pin hole which is provided in a vertical face of the engine mount which is in contact with the vehicle frame; and a displacement suppressing pin which is inserted through the frame-side pin hole and the engine mount-side pin hole to suppress relative displacement between the vehicle frame and the engine mount in a direction parallel to the contact face between them.

Solution to Problem

According to the above-described structure, as slippage between the vehicle frame and the engine mount is suppressed by the displacement suppressing pin, the occurrence of a torque in a bolt loosening direction due to the slippage is suppressed. Thus, loosening of a bolt or bolts is suppressed.

Desirably, the frame-side pin hole, the engine mount-side pin hole, and the displacement suppressing pin are respectively provided in plural numbers.

In a case where a force in a plurality of directions is applied to the vehicle frame and the engine mount due to the road surface input, if the displacement suppressing pin is only one, slippage may occur on the contact face between the vehicle frame and the engine mount in a rotating direction about the center of the displacement suppressing pin but if a plurality of displacement suppressing pins are provided, the slippage in the rotating direction can be suppressed.

Desirably, a spacer is provided between a head bearing surface of the bolt and a nut to be combined with the bolt.

As the distance between the head bearing surface of the bolt and the nut is larger, axial elastic deformation (easy deflection) of the bolt is easily caused. The influence of the slippage between the fastened objects can be absorbed by this axial elastic deformation of the bolt to suppress the occurrence of the slippage between the bolt or the nut and the fastened objects and to suppress the occurrence of a loosening torque. Therefore, the provision of the spacer between the head bearing surface of the bolt and the nut increases the distance between the head bearing surface of the bolt and the nut and makes the bolt easier to elastically deform axially. Thus, loosening of the bolt due to the slippage can be suppressed even if the slippage occurs between the vehicle frame and the engine mount.

The present disclosure relates an engine mount mounting structure for mounting an engine mount on a vehicle frame by tightening bolts horizontally, which comprises a pin hole which is formed in one of a vertical face of the vehicle frame which is in contact with the engine mount and a vertical face of the engine mount which is in contact with the vehicle frame; and a displacement suppressing pin which is formed on the other of the vertical face of the vehicle frame which is in contact with the engine mount and the vertical face of the engine mount which is in contact with the vehicle frame and which is inserted through the pin hole to suppress relative displacement between the vehicle frame and the engine mount in a direction parallel to the contact face between them.

Advantageous Effects of Invention

The present disclosure can suppress loosening of bolts which are tightened horizontally to mount the engine mount to the vehicle frame.

BRIEF DESCRIPTION OF DRAWINGS

Embodiment(s) of the present disclosure will be described by reference to the following figures, wherein.

DESCRIPTION OF EMBODIMENTS

Figure 1:
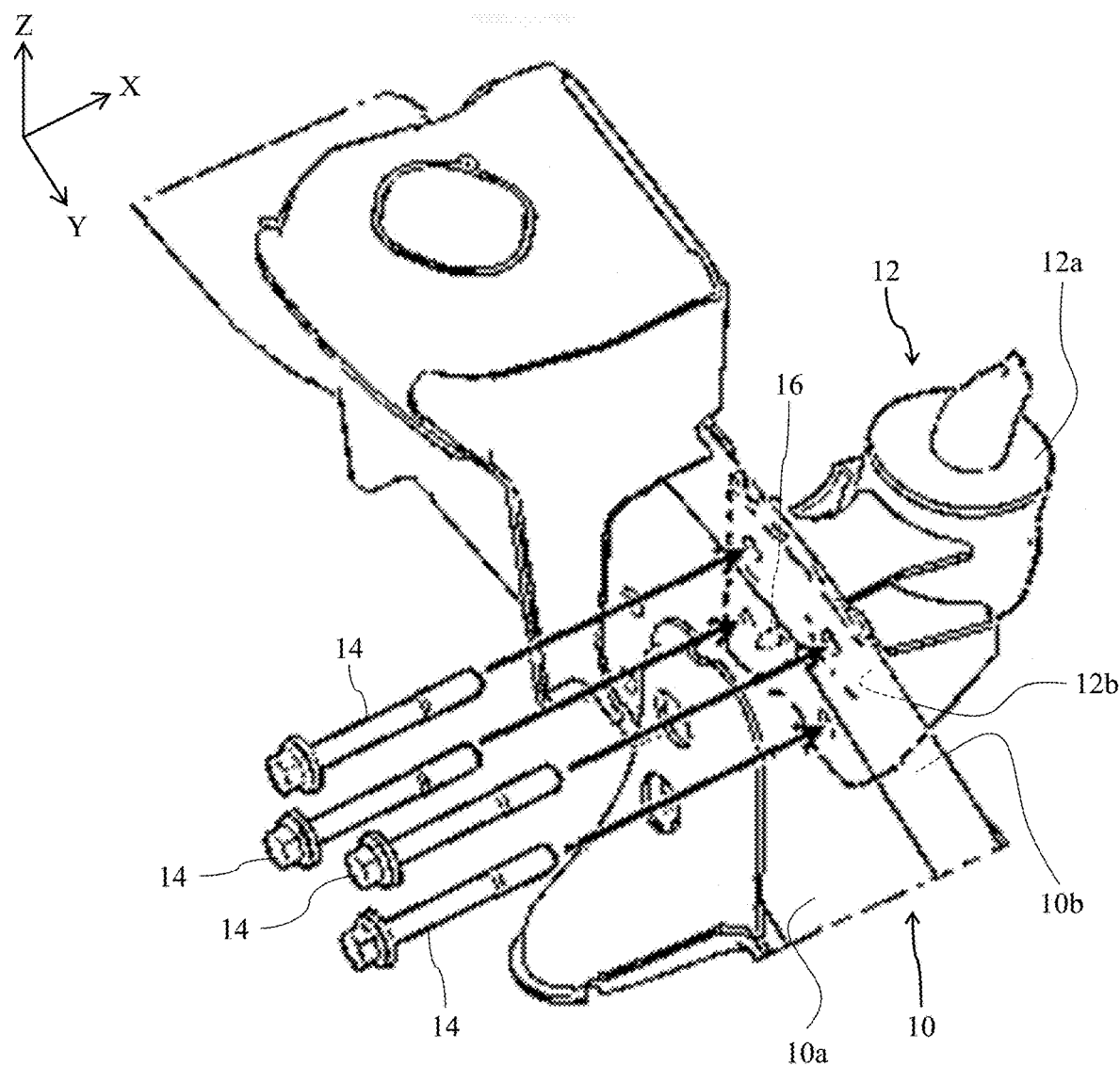
FIG. 1 is a perspective view of a mounting structure of an engine mount according to an embodiment.

FIG. 1 is a perspective view of a mounting structure of an engine mount according to an embodiment. In this embodiment, an engine mount 12 is mounted to a front side frame 10 that is a part of the vehicle frame. In practice, a plurality of engine mounts 12 are mounted to right and left front side frames, but FIG. 1 shows only one engine mount 12. It is determined in the drawings attached to the present specification that a width direction, a longitudinal direction, and a vertical direction of a vehicle body are an X-axis, a Y-axis (the forward direction is a Y-axis positive direction), and a Z-axis.

The front side frame 10 is a metal frame extending in the Y-axis direction; namely, in the longitudinal direction of the vehicle, and its XZ cross section shows a substantially rectangular outer shape, and this metal frame has a hollow inside space. Therefore, the front side frame 10 has a vertical outer face 10a and a vertical inner face 10b.

The engine mount 12 has a bracket including a main body part 12a and a bracket face 12b which is a vertical face composed of a metal. The bracket is a member to mount the engine mount 12 on the front side frame 10. As shown in FIG. 1, the bracket face 12b is fastened to the front side frame 10 by a plurality (4 in this embodiment) of bolts 14 to fix the engine mount 12 to the front side frame 10.

Figure 2:
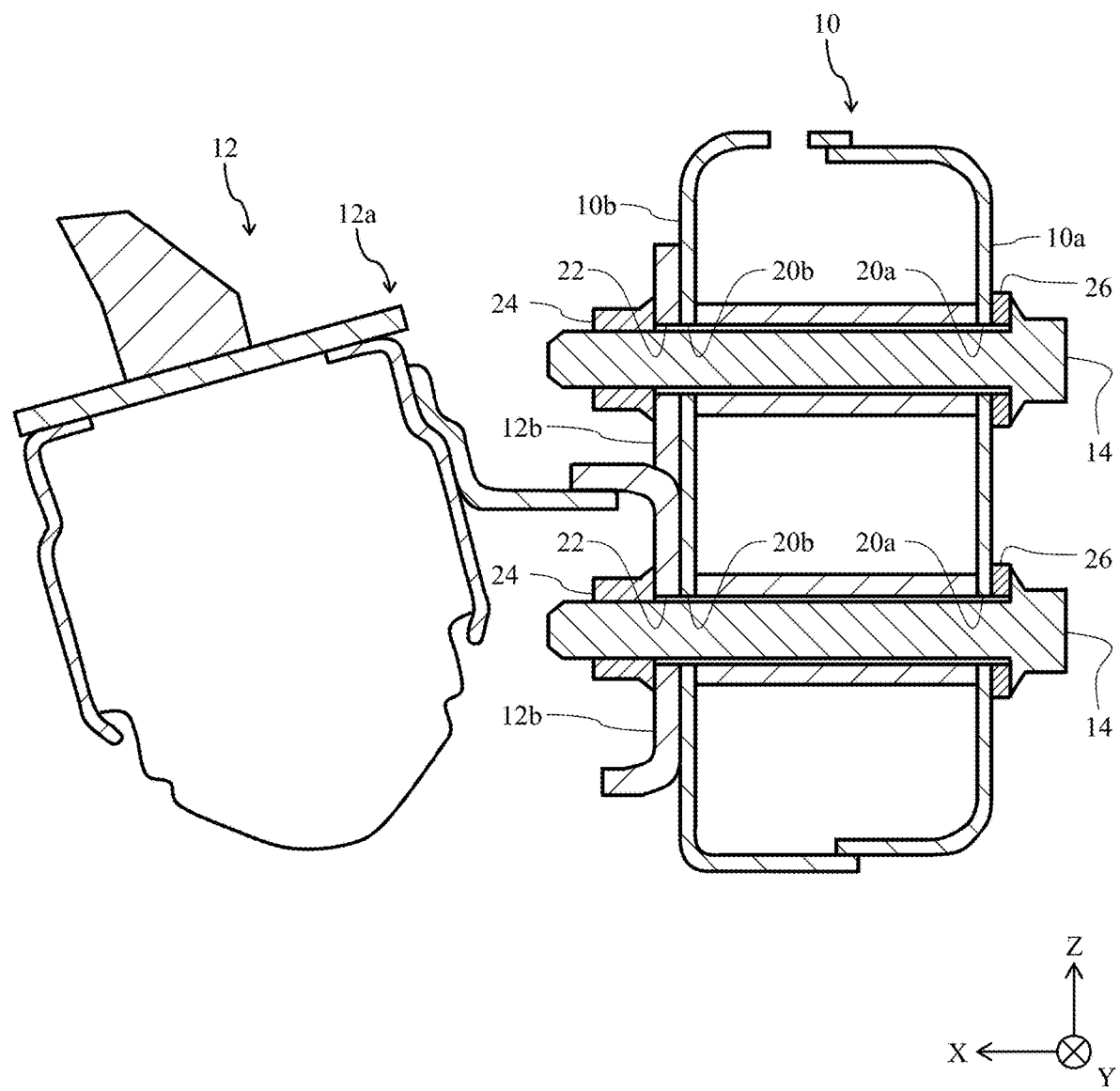
FIG. 2 is an X-Z sectional view taken through a position of bolts.

FIG. 2 shows an X-Z sectional view of the front side frame 10 and the engine mount 12 taken through a position of the bolts 14.

As shown in FIG. 2, the outer face 10a of the front side frame 10 is provided with plural bolt holes 20a. Similarly, the inner face 10b is provided with plural bolt holes 20b, and the bracket face 12b is provided with a plurality of bolt holes 22. The individual bolts 14 are inserted through the bolt holes 20a, 20b and 22 and tightened by nuts 24. Reference numeral 26 in FIG. 2 indicates a washer.

The bolt holes 20a, 20b and 22 are formed in the outer face 10a, the inner face 10b and the bracket face 12b which are vertical faces, and the individual bolts 14 inserted through them are tightened horizontally. Namely, the individual bolts 14 are fixed in a state extended horizontally.

As shown in FIG. 2, the bolt holes 20a, 20b, and 22 have a diameter larger than those of the bolts 14 to have a clearance between the inner faces of the bolt holes 20a, 20b and 22 and the outer faces of the bolts 14.

Back to FIG. 1, the engine mount mounting structure according to this embodiment has a displacement suppressing pin 16 to suppress relative displacement (namely "slippage") in a direction parallel to the contact face (YZ face) between the front side frame 10 and the bracket face 12b.

Figure 3:
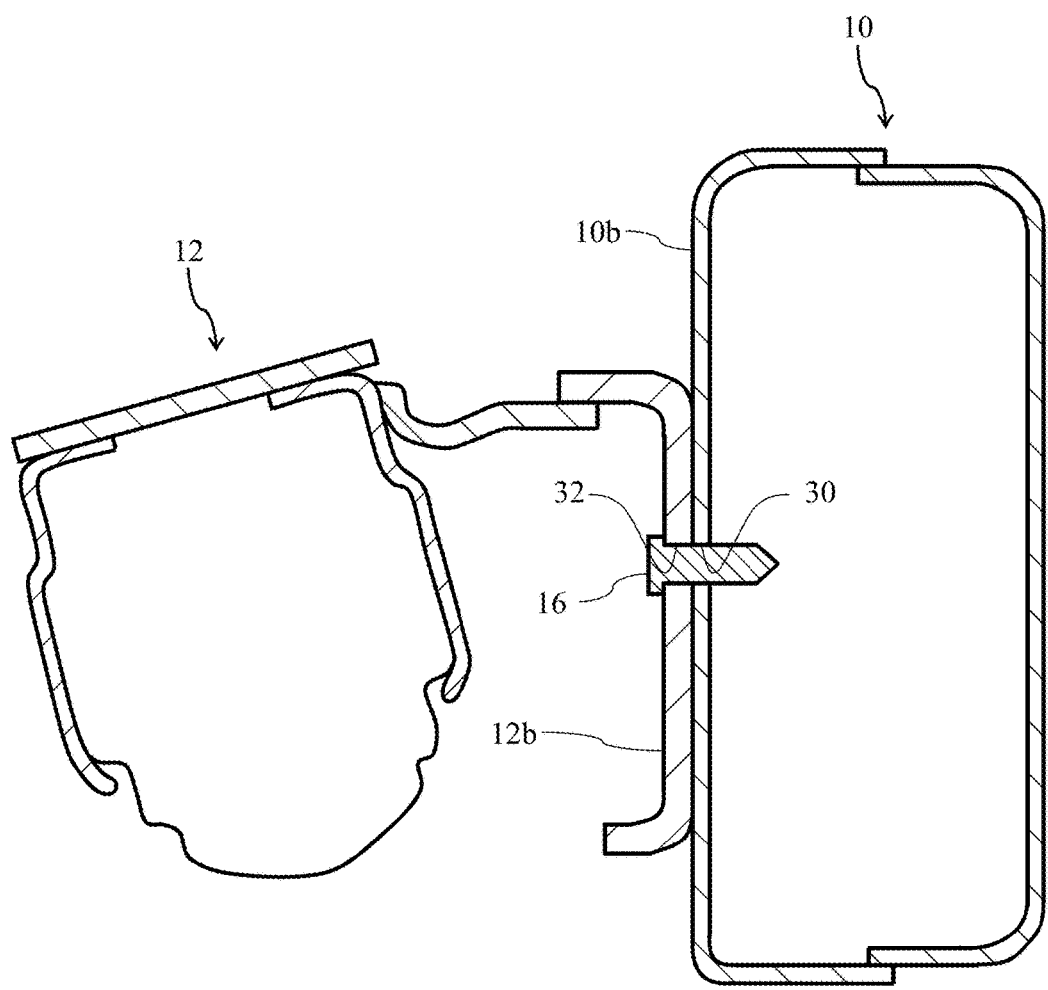
FIG. 3 is an X-Z sectional view taken through a position of a displacement suppressing pin.

FIG. 3 shows an X-Z sectional view of the front side frame 10 and the engine mount 12 taken through a position of the displacement suppressing pin 16.

As shown in FIG. 3, a frame-side pin hole 30 is formed in the inner face 10b which is a vertical face of the front side frame 10 and in contact with the bracket face 12b. Moreover, an engine mount-side pin hole 32 is formed in the bracket face 12b which is a vertical face of the engine mount 12 and in contact with the front side frame 10 (inner face 10b). The YZ cross section of the frame-side pin hole 30 and that of the engine mount-side pin hole 32 have a circular shape.

The displacement suppressing pin 16 is inserted through the frame-side pin hole 30 and the engine mount-side pin hole 32. The YZ cross section of the displacement suppressing pin 16 also has a circular shape. The displacement suppressing pin 16 suppresses the front side frame 10 and the bracket face 12b from relatively moving in the direction of the contact face. Namely, the slippage between them is suppressed.

From the point of view of suppression of the slippage between the front side frame 10 and the bracket face 12b, the displacement suppressing pin 16 is desirably press-fitted or interference fitted into the frame-side pin hole 30 and the engine mount-side pin hole 32. In other words, the distance between the outer face of the displacement suppressing pin 16 and the inner faces of the frame-side pin hole 30 and the engine mount-side pin hole 32 is desirably zero (0).

But, considering the removal of the engine mount 12 from the front side frame 10, there may be a slight clearance between the inner faces of the frame-side pin hole 30 and the engine mount-side pin hole 32 and the outer face of the displacement suppressing pin 16. In this case, this clearance is made smaller than the clearance between the inner faces of the bolt holes 20a, 20b, and 22 and the outer face of the bolt 14, so that the slippage between the front side frame 10 and the bracket face 12b can be suppressed more than in the case of not using the displacement suppressing pin 16.

Figure 4:
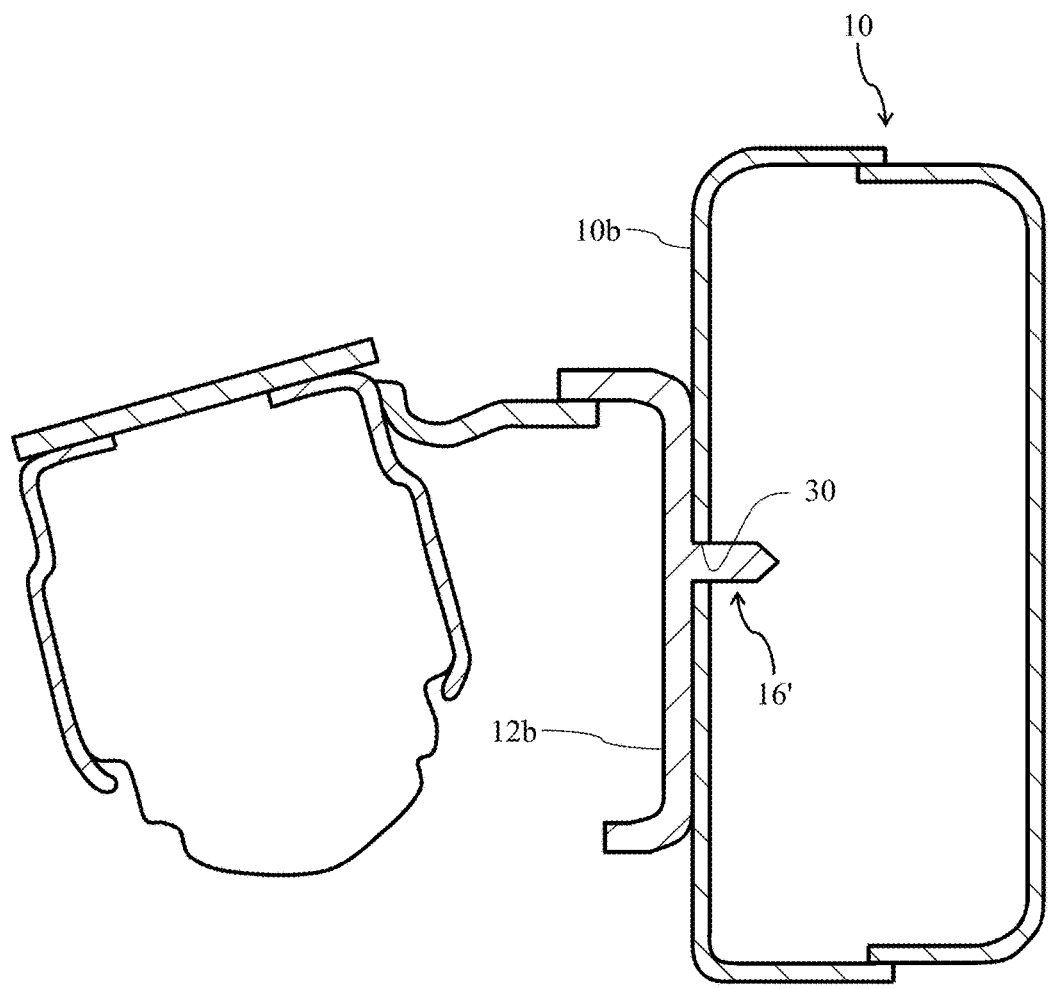
FIG. 4 is a view showing a modified example of the displacement suppressing pin.

FIG. 4 shows a modified example of the displacement suppressing pin 16. As shown in FIG. 4, a displacement suppressing pin 16' is integral with the bracket face 12b and may be formed to protrude from the bracket face 12b to pierce through the inner face 10b. Moreover, the displacement suppressing pin 16' may be inserted through the frame-side pin hole 30. Otherwise, the displacement suppressing pin 16' may be integrally formed with the inner face 10b to protrude from the inner face 10b toward the bracket face 12b. And the displacement suppressing pin 16' may be inserted through the engine mount-side pin hole 32.

Figure 5:
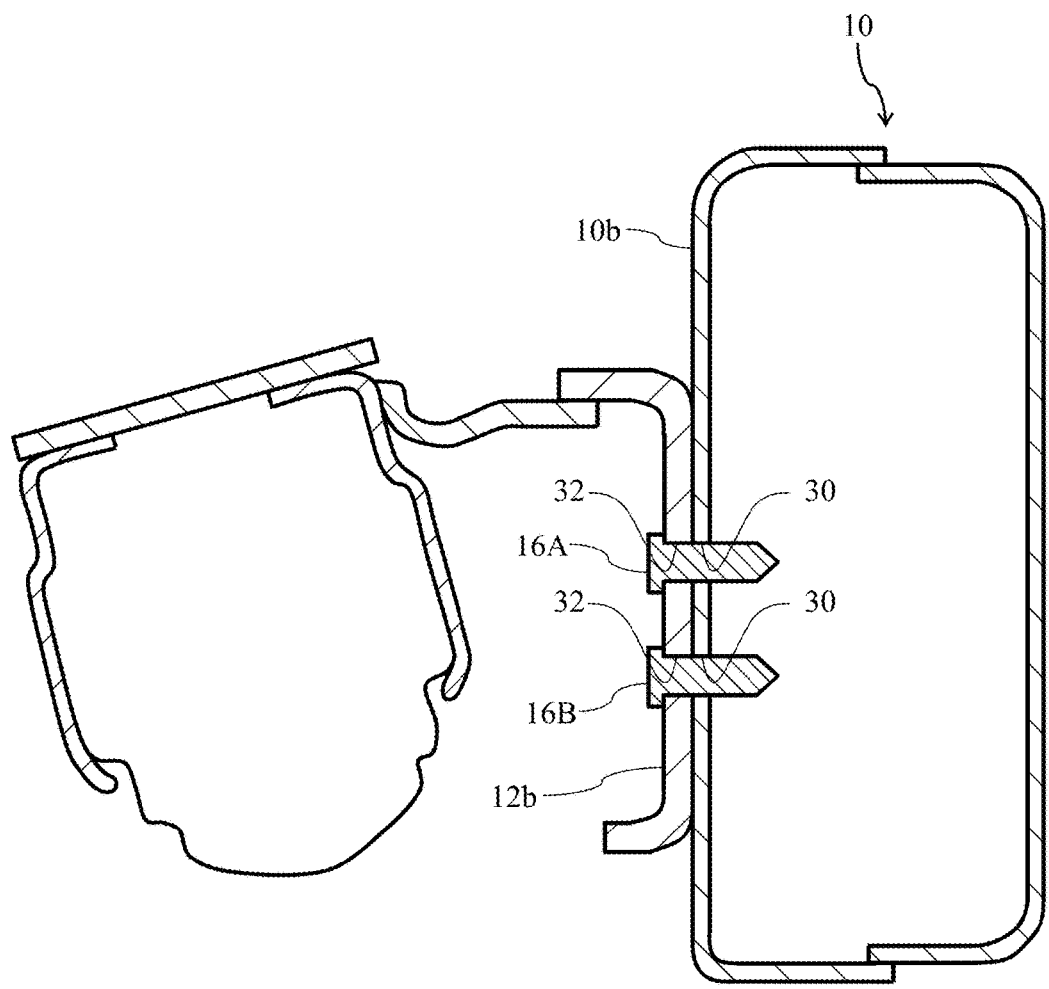
FIG. 5 is an X-Z sectional view taken through a position where a plurality of displacement suppressing pins are provided.

The displacement suppressing pin 16 may be provided in plural numbers. FIG. 5 shows an X-Z sectional view of the front side frame 10 and the engine mount 12 where two displacement suppressing pins 16 are provided.

When the plurality of displacement suppressing pins 16 are provided, the inner face 10b of the front side frame 10 is provided with a plurality of frame-side pin holes 30, and the bracket face 12b is provided with a plurality of engine mount-side pin holes 32. Additionally, the individual displacement suppressing pins 16 are each inserted through the frame-side pin holes 30 and the engine mount-side pin holes 32.

Figure 6:
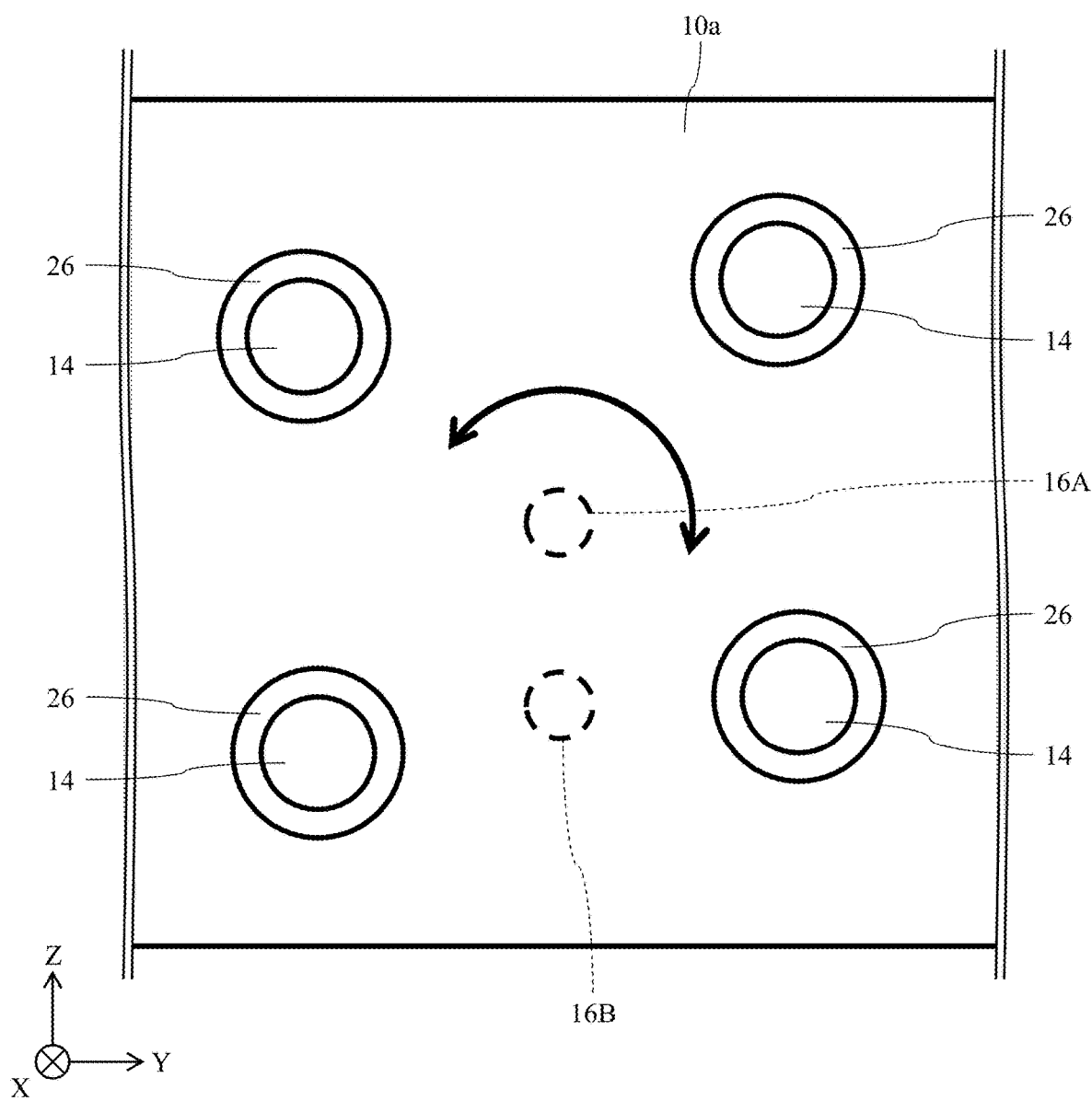
FIG. 6 is a side view of a vehicle frame where plural displacement suppressing pins are provided.

FIG. 6 is a side view (viewing the positive direction from the negative direction of the X direction in FIG. 1) of the front side frame 10 to which the engine mount 12 is mounted. FIG. 6 shows a plurality of bolts 14 (and washers 26) which are fixed to the outer face 10a. FIG. 6 also shows positions of two displacement suppressing pins 16A and 16B which are inserted through two frame-side pin holes 30 formed in the inner face 10b.

When a force is applied only in one direction (for example, a vertical direction) to the front side frame 10 and the bracket face 12b, slippage between the front side frame 10 and the bracket face 12b can be suppressed by only one displacement suppressing pin 16. However, in a case where only one displacement suppressing pin 16 (as the displacement suppressing pin 16A here) is provided and a force is applied to the front side frame 10 and the bracket face 12b in plural directions and parallel to the contact face between them, slippage might occur in the rotating direction with the displacement suppressing pin 16A as the center on the contact face between the front side frame 10 and the bracket face 12b as shown in FIG. 6.

Provision of the displacement suppressing pin 16 in plural numbers can suppress the above slippage in the rotating direction. For example, as shown in FIG. 6, the slippage in the rotating direction with the displacement suppressing pin 16A as the center is suppressed by the displacement suppressing pin 16B. Otherwise, the slippage in the rotating direction with the displacement suppressing pin 16B as the center can also be suppressed by the displacement suppressing pin 16A.

As described above, the slippage between the front side frame 10 and the bracket face 12b is suppressed by the displacement suppressing pins 16. Accordingly, the slippage is suppressed between the front side frame 10 and the bracket face 12b and the bolts 14 or the nuts 24 for tightening them, and torque in a bolt loosening direction is decreased. Thus, the simple structure according to this embodiment suppresses loosening of the bolts 14 for mounting the front side frame 10 to the engine mount 12.

Incidentally, as the distance between the head bearing surface of the bolt and the nut is larger, the bolt hardly becomes loose even if the slippage occurs between the fastened objects. This is explained below with reference to FIG. 7.

Figure 7:
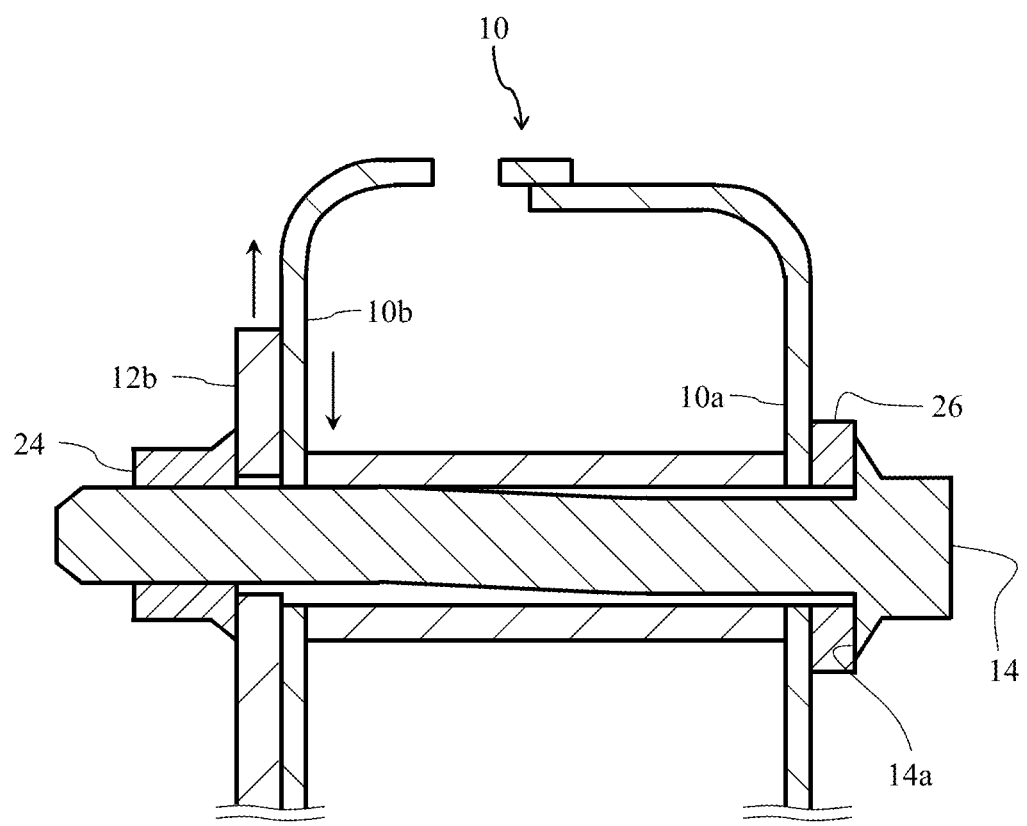
FIG. 7 is a view showing a state that slippage generated at the bearing surfaces of the bolt and the nut is suppressed by axial elastic deformation of the bolt.

FIG. 7 is a sectional view showing a state that the bracket face 12b is fixed to the front side frame 10 by the bolt 14 in the same manner as in the above-described embodiment. For example, a case that slippage occurs between the front side frame 10 and the bracket face 12b to relatively move the bracket face 12b toward the upper side of FIG. 7 is considered. When the slippage occurs between the front side frame 10 and the bracket face 12b and the nut 24 is moved upward together with the bracket face 12b, the bolt 14 is elastically deformed axially (namely, deflected), and an amount of movement of the head bearing surface of the bolt 14 (and the washer 26) with respect to the outer face 10a is suppressed.

Thus, even if the slippage occurs between the front side frame 10 and the bracket face 12b, the slippage between the head bearing surface of the bolt 14 and the outer face 10a is suppressed by the axial elastic deformation of the bolt 14; namely, the torque generated in the head bearing surface of the bolt 14 is reduced.

Here, as the distance between the head bearing surface of the bolt 14 and the nut 24 is larger, the bolt 14 is deflected easily. Therefore, as the distance between the head bearing surface of the bolt 14 and the nut 24 is larger, the bearing surface of the bolt 14 or the nut 24 becomes difficult to slip with respect to the fastened objects even if slippage occurs between the fastened objects. In other words, loosening of the bolt 14 hardly occurs.

Therefore, this embodiment may have a spacer between the head bearing surface of the bolt 14 and the nut 24 to be combined with the bolt 14 to increase the distance between the head bearing surface of the bolt 14 and the nut 24.

Figure 8:
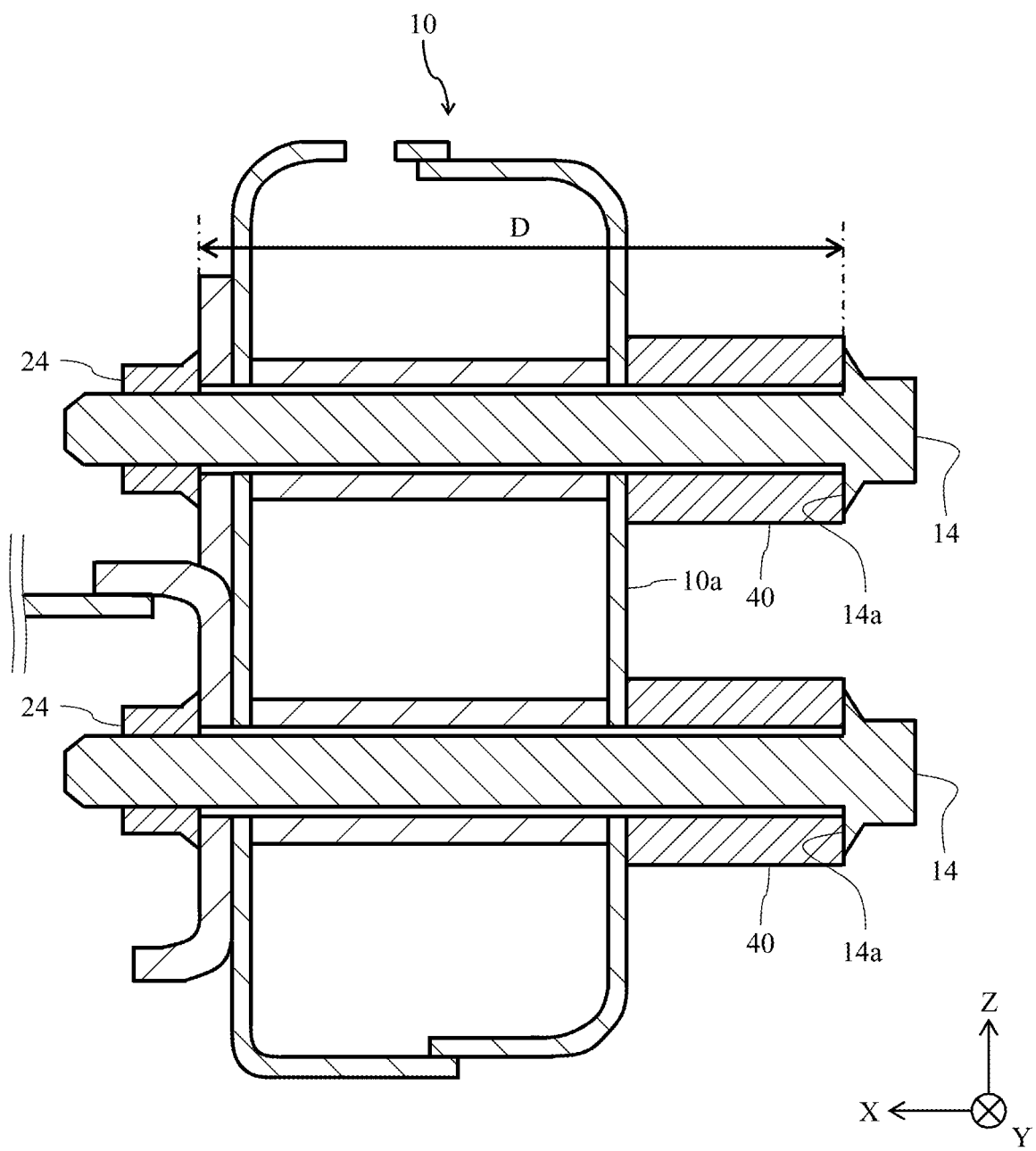
FIG. 8 is an X-Z sectional view taken through a position of bolts where a spacer is provided in addition to the displacement suppressing pins.
Figure 9:
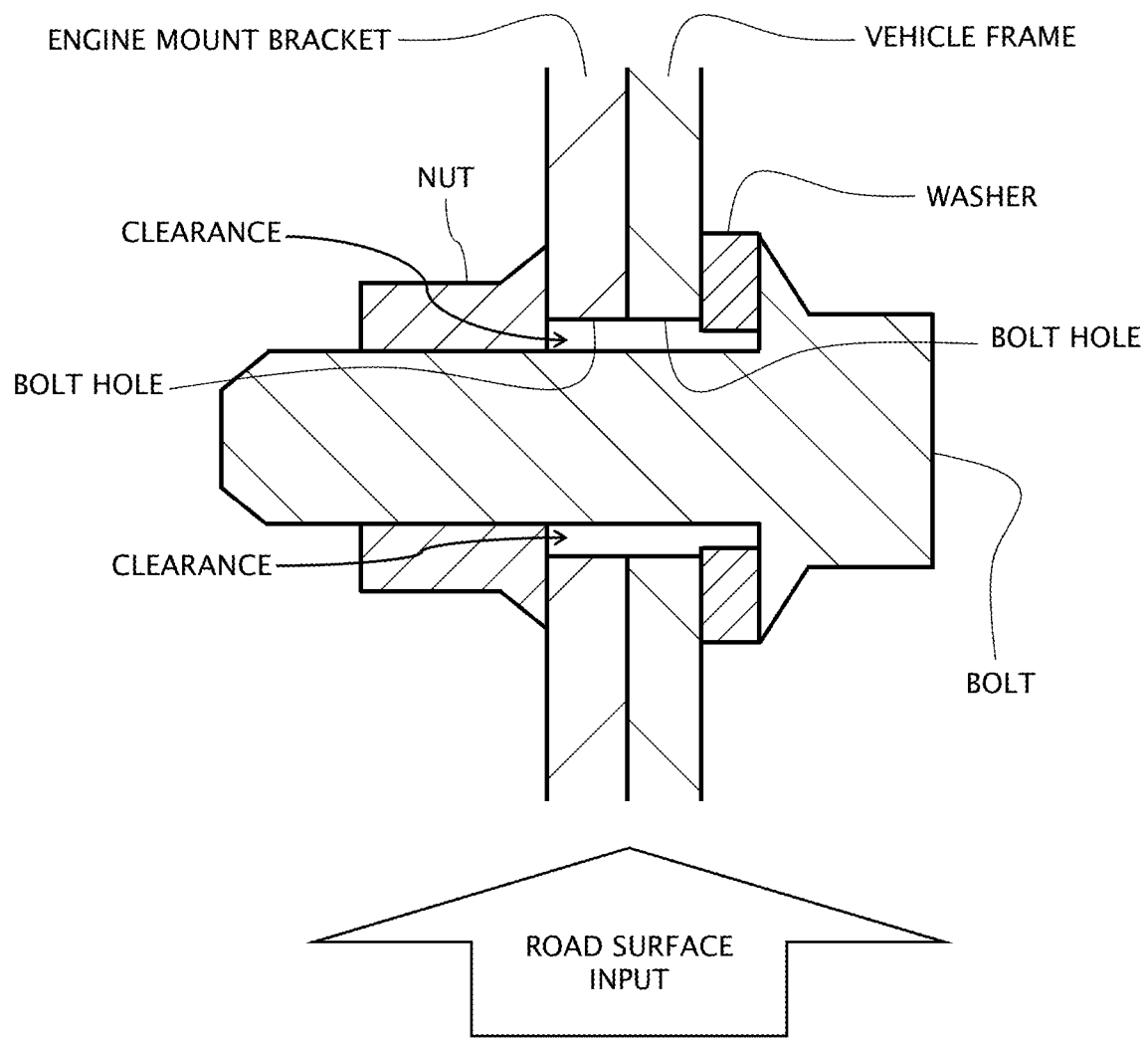
FIG. 9 is a view showing a state that a clearance is formed between the inner face of the bolt hole and the outer face of the bolt.

FIG. 8 shows an X-Z sectional view of the front side frame 10 taken through a position of the bolts 14 where the spacer 40 is provided between the head bearing surface of the bolt 14 and the nut 24. The provision of the spacer 40 increases a distance D from the head bearing surface of the bolt 14 to the nut 24. Accordingly, even when a slight clearance is generated between the inner faces of the frame-side pin hole 30 and the engine mount-side pin hole 32 and the outer face of the displacement suppressing pin 16 (see FIG. 3), the bolts 14 can be suppressed from loosening because the bolts 14 are deflected more easily even if a slight slip is caused between the front side frame 10 and the bracket face 12b.

Embodiments of the present disclosure have been described, but the above-described embodiments are mere examples in all respects and do not limit the scope of the disclosure. The disclosure includes various types of modified embodiments without departing from the essence of the disclosure.

The invention claimed is:

1. An engine mount mounting structure for mounting an engine mount on a vehicle frame by tightening bolts horizontally, comprising:
   a frame-side pin hole which is provided in a vertical face of the vehicle frame which is in contact with the engine mount;
   an engine mount-side pin hole which is provided in a vertical face of the engine mount which is in contact with the vehicle frame;
   a displacement suppressing pin which is inserted through the frame-side pin hole and the engine mount-side pin hole to suppress relative displacement between the vehicle frame and the engine mount in a direction parallel to the contact face between them; and the vehicle frame comprises a hollow interior space, wherein a tip of the displacement suppressing pin in an insertion direction of the displacement suppressing pin is within the hollow interior space, and a volume of the hollow interior space is greater than a volume of the frame-side pin hole.

2. The engine mount mounting structure according to claim 1, wherein the frame-side pin hole, the engine mount-side pin hole, and the displacement suppressing pin are respectively provided in plural numbers.

3. The engine mount mounting structure according to claim 1, wherein a spacer is provided between a head bearing surface of a bolt and a nut to be combined with the bolt.

4. The engine mount mounting structure according to claim 2, wherein a spacer is provided between a head bearing surface of a bolt and a nut to be combined with the bolt.

5. The engine mount mounting structure according to claim 1, wherein the vehicle frame is a front side frame.

6. The engine mount mounting structure according to claim 1, wherein the frame-side pin hole and the engine mount-side pin hole are in communication with each other.

7. An engine mount mounting structure comprising:

a vehicle frame comprising a first vertical face with a first bolt hole;

an engine mount comprising a second vertical face with a second bolt hole, wherein the first vertical face and the second vertical face are in contact with one another;

a displacement suppressing pin that suppresses relative displacement between the vehicle frame and the engine mount in a direction parallel to the first vertical face and the second vertical face; and a bolt inserted through the first bolt hole and the second bolt hole to tighten the first vertical face to the second vertical face.

8. The engine mount mounting structure according to claim 7, wherein the vehicle frame comprises a hollow interior space, and the displacement suppressing pin is inserted into the hollow interior space.

9. The engine mount mounting structure according to claim 8, wherein the first vertical face comprises a first pin hole;

second vertical face comprises a second pin hole; and the displacement suppressing pin is inserted through the first pin hole and the second pin hole.

10. The engine mount mounting structure according to claim 7, wherein the first vertical face comprises a first pin hole;

second vertical face comprises a second pin hole; and the displacement suppressing pin is inserted through the first pin hole and the second pin hole.

11. The engine mount mounting structure according to claim 1, wherein the displacement suppressing pin extends in the vehicle width direction.

12. The engine mount mounting structure according to claim 7, wherein the bolt and the displacement suppressing pin extend in parallel.

* * * * *